March 12, 1940.  C. R. KADDELAND ET AL  2,192,916
ACCELERATING FEEDER
Filed March 21, 1938  6 Sheets-Sheet 1

INVENTORS
CHRISTEN R. KADDELAND
CHARLES W. HARROLD
BY Kwis Hudson & Kent
ATTORNEYS March 12, 1940.  C. R. KADDELAND ET AL  2,192,916
ACCELERATING FEEDER
Filed March 21, 1938  6 Sheets-Sheet 4

INVENTORS
CHRISTEN R. KADDELAND
CHARLES W. HARROLD
BY
ATTORNEYS

Patented Mar. 12, 1940

2,192,916

UNITED STATES PATENT OFFICE 2,192,916

ACCELERATING FEEDER

Christen R. Kaddeland, Shelton, Conn., and Charles W. Harrold, University Heights, Ohio, assignors to Harris-Seybold-Potter Company, Cleveland, Ohio, a corporation of Delaware Application March 21, 1938, Serial No. 197,088

40 Claims. (Cl. 271—53)

This invention relates to improvements in accelerating feeders, that is to say, sheet feeders adapted to take a sheet from a position of rest, move it at an accelerating speed up to a predetermined speed equivalent to that of a sheet handling cylinder revolving at a constant rate, and then transfer it to that cylinder. The feeder illustrated is of the rotating type.

The procedure above indicated is effected in the present instance by a revolving transfer member which is driven from a constant speed sheet handling cylinder, but with an interrupted motion, the transfer member standing still during a portion of the rotation of the sheet handling cylinder, then accelerating to a surface speed the same as that of said cylinder, rotating at such speed through the greater part of a revolution, and then decelerating to a stop, the transition up to speed and down again to a stop being effected in a gradual, smooth manner, so that shock and noise are reduced to a minimum.

One of the objects of the invention is the provision of a feeder of the character stated which shall be simple in form, embodying relatively few parts, and at the same time certain and accurate in operation.

Another object is the provision of a mechanism of the class described wherein the gearing employed shall be circular segments exclusively, and therefore not subject to unusual inaccuracies in manufacture or assembly.

Another object is to provide a mechanism of the class described which shall be particularly well adapted for use in connection with stream feeding, that is where the sheets are advanced toward register position at relatively slow speed in lapped formation.

Still another object is the provision of means for effecting a short reverse rotation of the transfer grippers after they have been decelerated, in order that they may be moved rearwardly into gripping relation with the forward edge of a sheet at rest.

Another object is the provision of means for avoiding interference between a sheet on the feed board closely adjacent the front registering stops and the transfer grippers as the latter are being decelerated and are approaching their sheet gripping position, whereby the lapped sheets may be made to follow closely one upon another to the registering guides, and re'atively long sheets may be fed to a printing cylinder of given diameter.

Other objects and features of novelty will appear as we proceed with the description of those embodiments of the invention which, for the purposes of the present application, we have illustrated in the accompanying drawings, in which.

Figures 1, 2:
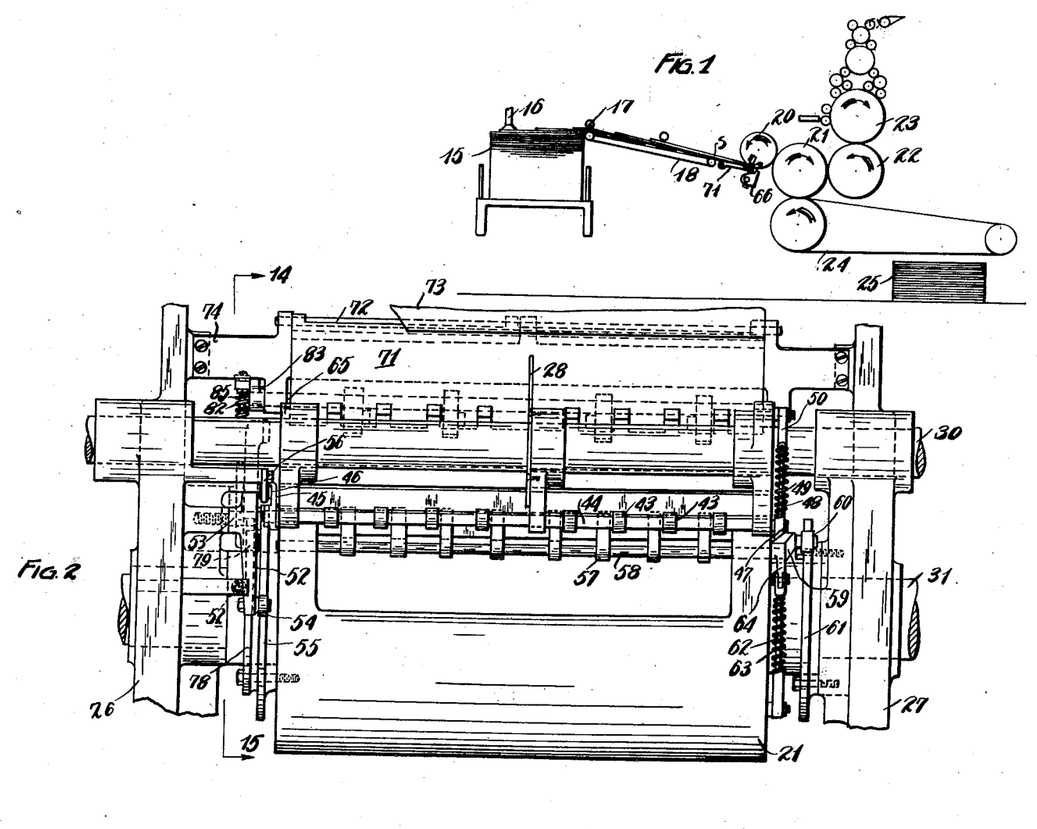
Fig. 1 is a diagrammatic illustration of a sheet feeder, a printing press, and a sheet delivery mechanism, in connection with which the present invention may be employed.
Fig. 2 is a fragmental plan view of the feeding cylinder and of the impression cylinder of a press, the driving mechanism being omitted.

In Fig. 1 of the drawings, we have illustrated at 15 a stack of paper sheets with suckers 16 for separating the uppermost sheet from the stack and feeding the sheet into a roller forwarding means 17, by means of which it is caused to move down a conveyor 18 into register with stop blocks 66 which are raised temporarily to receive the sheet. The sheet is then taken by grippers on feed cylinder 20, which at the time is stationary, and that cylinder is then given an accelerating motion, bringing it up to the surface speed of impression cylinder 21 of a printing press. When the grippers of cylinder 20 come into line with the line of centers of the two cylinders 20 and 21, they are moving at the surface speed of cylinder 21, and the transfer is made at that point. 22 and 23 represent other cylinders of a printing press. After the sheet has been printed it is grasped by sheet grippers on an endless conveyor 24 and delivered to a pile 25. The present invention is concerned particularly with the parts 16 to 21 inclusive and 66 of this figure, that is, the mechanism for feeding sheets to the impression cylinder of the press.

The frame members of a printing press are indicated in the drawings at 26 and 27. In these frame members there is journaled a shaft 30 upon which the transfer member or feeding cylinder 20 is carried. Although this element is referred to herein as a cylinder, it will be understood that it is not necessarily a complete cylinder, as only a small portion of its periphery need actually engage the sheets which are moved by it. For this purpose one or more discs 28 mounted on the shaft 30 may be used to assist in the support of the sheet while it is being transferred. A shaft 31 mounted in the frame members 26 and 27 carries the impression cylinder 21.

The two cylinders 20 and 21 are connected by driving mechanism outside of the frame member 26, this mechanism being such that the feeding cylinder 20 remains stationary for a part of the time occupied by each revolution of the cylinder 21, is then accelerated up to the same surface speed as the cylinder 21, and after turning through a considerable arc is again decelerated and brought to a stop. This mechanism will now be described.

Figure 3:
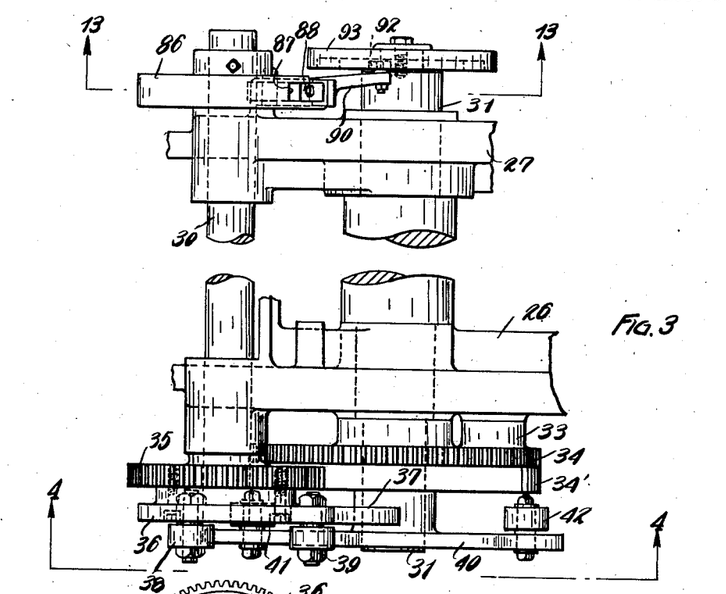
Fig. 3 is a plan view of the same machine, the cylinders being omitted and the driving mechanism, which is situated outside of the machine frame, being included.

On a shaft 32 of the printing press, which may be the power shaft, there is a pinion 33 which meshes with a gear 34, Fig. 3, on shaft 31, and by means of which the cylinder 21 is driven continuously at constant speed. The rear part of gear 34, which meshes with pinion 33, is continuous, but the forward part is a sector merely, and will be referred to herein as sector 34'. This sector extends through slightly more than 180°, and is adapted to mesh with a sector 35 on the shaft 30. The latter sector extends through an angle of something more than 270°.

The forward end of shaft 30 has a plate 36 attached thereto, this plate having an extension 37 of fish-tail shape. Upon the plate 36 there are carried two rollers 38 and 39 which project forwardly therefrom and run upon a cam plate 40 which is attached to the forward end of shaft 31. Cam plate 40 also carries two rollers 41 and 42 that are mounted on the inner side of that plate and adapted to engage at different times with the outer edges of extension 37. Cam plate 40 has four principal contours, lettered A, B, C and D in the drawings. The part A is a rising cam surface, the part B a gradually declining surface, the part C a concentric surface, and the part D a sharply declining surface.

A series of sheet grippers 43 are mounted on a shaft 44 which extends through the cylinder 20. One the forward end of this shaft there is a crank arm 45 having a roller 46 on its extremity. At the opposite end of shaft 44 there is another crank arm 47, to the extremity of which is pivoted a rod 48 surrounded by a coil spring 49 which bears against an abutment 50 pivotally secured to the cylinder. The spring 49 therefore tends to hold the gripper fingers in closed position. These grippers are opened at the proper time to receive a sheet from the feed board by means of a pad 51 which is caused to press downwardly upon roller 46. The pad 51 is carried by a lever 52 pivoted at 53 to the frame. The other end of this lever carries a roller 54 which runs upon a cam plate 55 attached to cylinder 21. The high spot of this cam therefore serves to depress the pad 51. The follower 54 is held against its cam by any suitable spring means, as for instance by a coil spring 52'. A cam block 56 is mounted on frame member 26, and is so positioned that when the gripper fingers 43 cross the line of centers of the cylinders 20 and 21, where the sheet is to be transferred from the feeding cylinder to the printing cylinder, see Fig. 15, the roller 46 engages cam 56 and opens the grippers 43. The cam block 56 maintains the grippers open for a short time during the constant speed rotation of the feeding cylinder, and then permits them to close again.

Figures 13, 14, 15, 16:
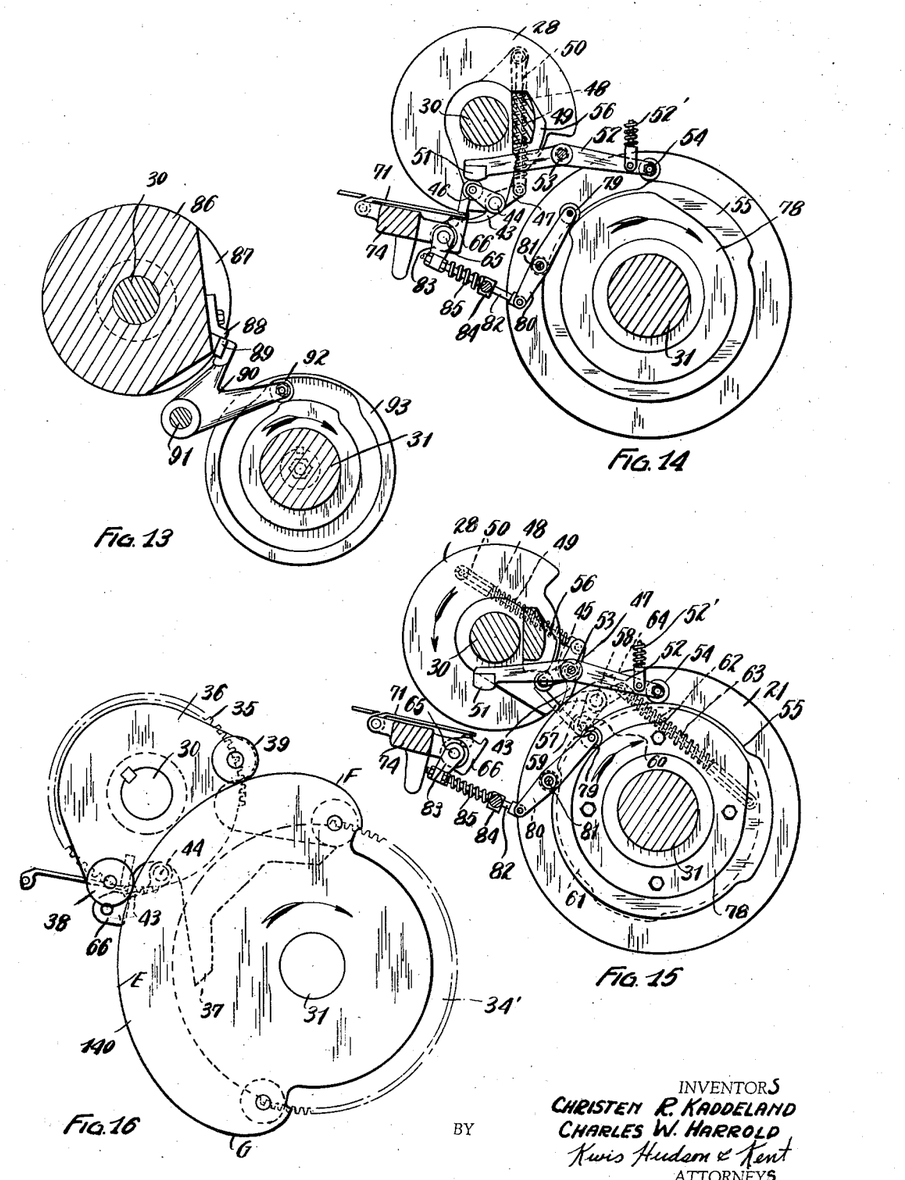
Fig. 13 is a vertical sectional view taken substantially on the line 13—13 of Fig. 3, showing means for locking the feed cylinder against further reverse rotation.
Fig. 14 is a vertical sectional view taken substantially on the line 14—15 of Fig. 2 showing the parts in the position where a registered sheet is about to be gripped, and illustrating the control means for the registering stops, and for the grippers of the feed cylinder.
Fig. 15 is also a view on the line 14—15 of Fig. 2 showing the parts in the position where a sheet is being transferred from the feeding cylinder to the printing cylinder, and showing the control mechanism for the grippers of both cylinders.
Fig. 16 is a view corresponding to Figs. 4 to 9 inclusive but illustrating another form of the invention.

The sheet grippers on the printing cylinder 21 are shown at 57 in Fig. 15. They are mounted upon a shaft 58 which extends through the cylinder. On its rear end this shaft has keyed thereto a short crank 59 with a roller follower 60 on its extremity. This follower rests upon a cam plate 61, which permits the fingers to remain in closed position at all times except when they are taking a sheet from the feeding cylinder and releasing it to the delivery conveyor 24 or equivalent take-off mechanism. To this end the cam plate 61 is provided with two high spots as shown in Fig. 15. The gripping fingers 57 in the position illustrated in Fig. 15 have just closed upon a sheet as it is being transferred from the feeding cylinder. The follower 60 is held against its cam by a rod and coil spring 62 and 63 respectively on the rear end of the cylinder 21, this spring working on a crank 64 which may be formed integral with the crank 59.

The front guide, by means of which the sheet is brought to a stop and registered before being taken by the feeding cylinder 20, comprises a series of stop blocks 66 which are supported upon and are adjustable lengthwise of a rock shaft 65, and are provided with set screws 67 running in a keyway of the shaft by means of which all the blocks are maintained in the same angular position. Each block includes a front stop finger 68 that is adapted to be projected into the path of each sheet for registration purposes, as indicated in full lines in Fig. 11. Extending laterally from each block 66 there is a headed stud 69 which carries a roller 70 that is adapted to engage the undersurface of a forward section 71 of the feed board. The rear end of this forward section is mounted upon a rock shaft 72. To the rear of section 71 there may be a rigid section 73 of the feed board onto which the stream of sheets is delivered by the conveyor 18. The two rock shafts 65 and 72 may be carried in brackets or projections formed on a cross bar 74 suitably attached to the frame members 26 and 27, as illustrated in Fig. 2. The forward section 71 of the feed board is provided at intervals along its forward edge with slots 76 for the accommodation of the gripper fingers 43. The gripper bar against which the gripper fingers move is indicated at 77 in Figs. 10 and 11.

Figure 10:
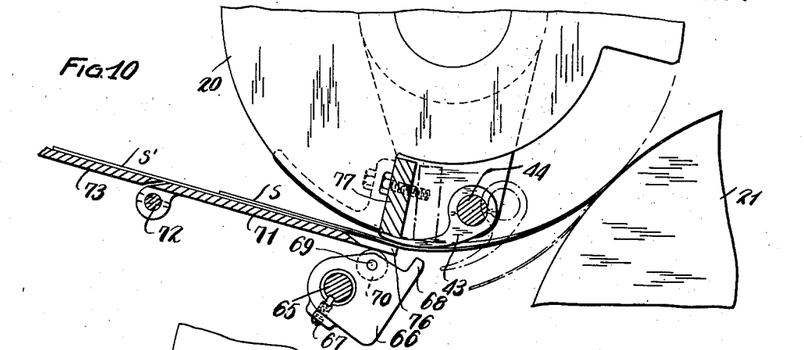
Fig. 10 is a detailed vertical sectional view showing the forward section of the feed board and the front registering stops lowered while the tail end of a sheet is being drawn off the feed board by the impression cylinder, the feed cylinder at this time having completed 360° of movement from its sheet gripping position, and being in the act of approaching the end of its decelerating movement.

At the proper time in the cycle the rock shaft 65 is caused to oscillate through a small angle to raise blocks 66 from the full line position of Fig. 10 to the full line position of Fig. 11, and then a trifle later in the cycle to return to the position of Fig. 10. This is accomplished by means of a cam 78 carried upon shaft 31, see Figs. 14 and 15, through the following mechanism. The cam roller 79 runs on cam 78, being mounted in one end of the lever 80 which is pivotally supported at 81 upon the frame. The opposite end of this lever has a pivotal connection with one end of a rod 82 which is swiveled to the outer extremity of a crank 83 fixed to the forward end of rock shaft 65. Rod 82 extends through a hole in a swivel block 84 mounted in the frame, and between the latter block and the crank 83 there is a coil spring 85 surrounding the rod, the function of which is to turn the rock shaft 65 clockwise and maintain the stop blocks 66 lowered so long as the cam 78 permits. When the high spot of that cam engages roller 79, the crank 83 is turned anti-clockwise and the blocks 66 are swung up to their full line position of Fig. 11. At the same time, of course, the forward section 71 of the feed board is also raised by rollers 70 to its full line position of that figure. While the mechanism described has been found satisfactory for raising and lowering the feed board section 71 and front stop fingers 68, and is herein shown and described as the preferred construction for accomplishing this purpose, it will be appreciated that these parts may be otherwise constructed and operated, that the feed board may be moved independently of the front stop fingers, and on the other hand the stop fingers may be permanently mounted on the forward edge of the swinging section of the feed board, the lowering movement of the latter being made sufficient to withdraw the front stops to whatever degree may be necessary to get them out of the way after the forward edge of the sheet has been gripped by the sheet grippers of the feed cylinder. After the sheet S has been registered against the stop fingers 68 and gripped by the grippers 43, the stop blocks immediately swing down to the full line position of Fig. 10, at the same time lowering the forward section 71 of the feed board. The grippers 43 are then accelerated and the sheet is withdrawn from the feed board quite rapidly as compared to the rate of travel of the stream of sheets on the feed board. When the sheet is transferred to the grippers 57 of the impression cylinder the grippers 43 are of course open, but they close again shortly afterward and remain closed during the remainder of one revolution of the feed cylinder and for a short distance therebeyond, that is, until the gripper shaft 44 reaches the dotted line position of Figs. 10 and 11. The feed board and front stops remain down while the grippers pass, as indicated in Fig. 10. At this time the rotation of the cylinder has been largely decelerated and the grippers are moving quite slowly. There is no danger of their tearing the tail edge of the sheet S, however, as the lowered feed board provides plenty of room for the sheet to pass beneath the grippers. For the same reason the forward edge of the next sheet S' may be advanced close to the forward edge of the feed board without interference with these grippers. At a time after the grippers 43 and the tail edge of sheet S have passed the forward edge of the feed board 71, for example when they reach the position indicated in dotted lines in Fig. 10, the high spot of cam 55 engages roller 54 and causes pad 51 to swing down for opening the grippers 43. The reverse movement of the feed cylinder then takes place. Shortly after grippers 43 and sheet S have passed the forward edge of the feed board, cam 78, working through lever 80 and rod 82, swings stop blocks 66 and feed board section 71 up into full line position of Fig. 11. The latter action of these parts may take place during the last stages of the deceleration of cylinder 20 or during the reverse movement thereof, or after the reverse movement has been completed, but occurs in sufficient time for the stops to intercept the forward edge of the next sheet S' and present the latter in proper position adjacent the feed cylinder before the latters grips it and removes it from the feed board. The bar 77 should be notched out at proper intervals to clear the stop fingers 68 so that it may pass the latter fingers on its reverse movement in case the fingers are then in their raised position. While the stop fingers are still in operative position the roller 54 travels off the high spot of cam 55 and the grippers close on the sheet S' and a new cycle begins.

On the rear extremity of shaft 30 beyond the frame as illustrated particularly in Fig. 3, there is fixed a wheel or disk 86 in which is formed a groove 87 wherein we mount a small angular stop 88, Fig. 13. This stop is adapted to be engaged by a wear plate 89 on a bell crank lever 90 which is pivoted at 91 to the frame. The other arm of the bell crank carries a follower 92 which runs in the groove of a box cam 93 fixed upon the rear end of shaft 31. The function of stop 88 and its cooperating parts is to limit the reverse movement of the feed cylinder and correctly position the cylinder at the time when it is taking a sheet from the feed board.

*Operation*

Figure 4:
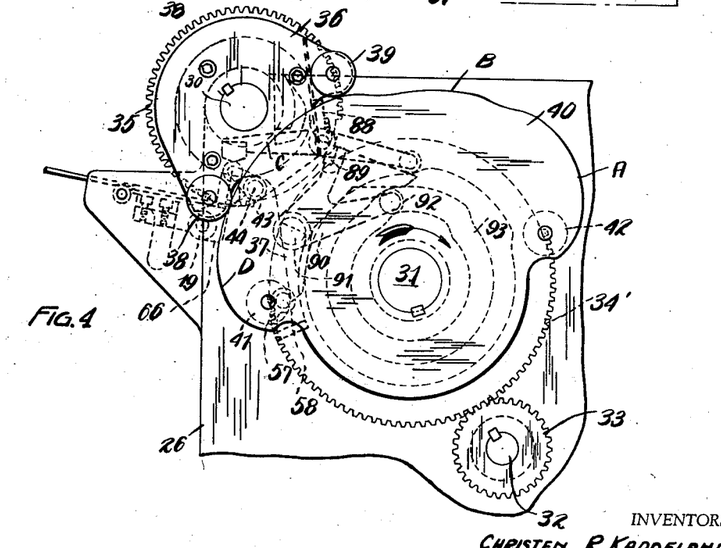
Fig. 4 is an elevational view looking in the direction of arrows 4—4 of Fig. 3, and showing the feeding cylinder at the point where its grippers have just grasped a sheet, and the motion of acceleration is upon the point of beginning.

Starting with the position of the parts illustrated in Fig. 4, it may be assumed that a sheet has come down the conveyor 18 and feed board 73, 71 and been stopped and registered against the front stop fingers 68, and that the sheet grippers 43 have opened and closed upon the forward edge of the sheet. The rollers 38 and 39 at the moment are both engaging the circular segment C of the cam 40, and hence there is no tendency upon the part of that cam to rotate the feed cylinder. The roller 41 has just engaged the fish-tail extension 37 of plate 36. The front stop mechanism is then substantially in the condition illustrated in Fig. 14. Immediately after the fingers 43 close upon the sheet the high spot of cam 78 runs out from under the follower 79, whereupon the spring 85 turns the oscillatable shaft 65 clockwise, thus throwing the forward stop fingers 68 down to the position of Figs. 10 and 15 and lowering the pivoted portion of the feed board.

Now, as the cylinder 21 continues to rotate in a clockwise direction, the roller 41, traveling up the edge of the extension 37, gives that extension, together with the cylinder 20, a forward impetus in an anti-clockwise direction, which impetus increases steadily as the roller 41 approaches the axis of the cylinder 20. At the same time the roller 38 on cylinder 20 travels over the declining segment D of cam 40, which is so shaped as not to interfere with the forward accelerating rotation of cylinder 20, while at the same time preventing that cylinder from moving so fast as to separate the extension 37 from the roller 41. Shortly after the accelerating movement of cylinder 20 begins, cam 93 lowers roller follower 92 and moves wear plate 89 out of the path of stop 88.

During the accelerating movement of cylinder 20 the roller 60 rides over a high spot of cam 61 and opens sheet grippers 57 of cylinder 21.

Shortly before the cylinder 20 arrives at the sheet transferring point, the accelerating movement ends and the gear sectors 34' and 35 come into mesh, starting the constant speed movement of the feed cylinder. Shortly after this constant speed movement is initiated the grippers 43 and 57 come into position along the line of centers of the two cylinders 20 and 21, as indicated in Fig. 15. Thereupon the grippers 57 close and the grippers 43 are opened by the engagement of roller 46 with cam block 56. The grippers 43 are swung out sufficiently by this means so that during the next portion of the constant speed motion they clear the front edge of the sheet. Fig. 5 shows the mechanism at the point where the constant speed movement of the feed cylinder begins, and Fig. 6 shows it at the point of transfer of a sheet to the printing cylinder 21.

Figure 7:
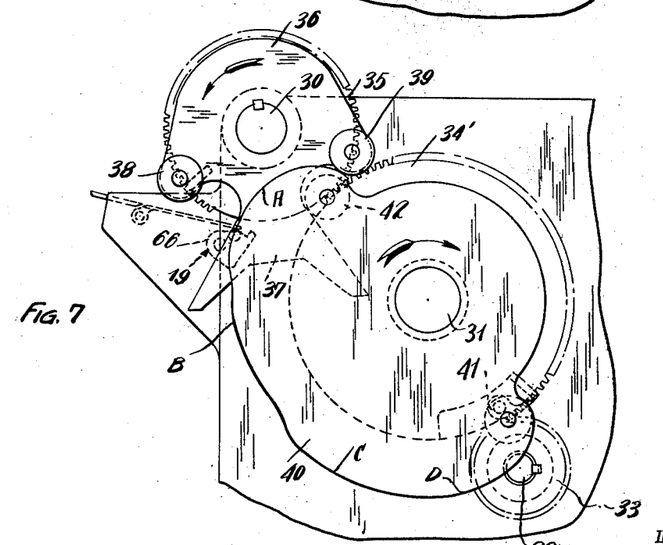
Fig. 7 is a view similar to Figs. 4 and 5, showing the position of the parts where the uniform motion of the feeding cylinder is terminated and the decelerating motion is beginning.

In the illustrated mechanism the gear sector 34' occupies an angle of a little over 180°, and the relative diameters of this gear and the gear 35 are such that the gear 35 extends through an angle of something over 270°. The rotation through these angles from approximately the position indicated in Fig. 5 brings the parts to the position indicated in Fig. 7. This is the end of the constant speed rotation of the feeding cylinder.

Figure 8:
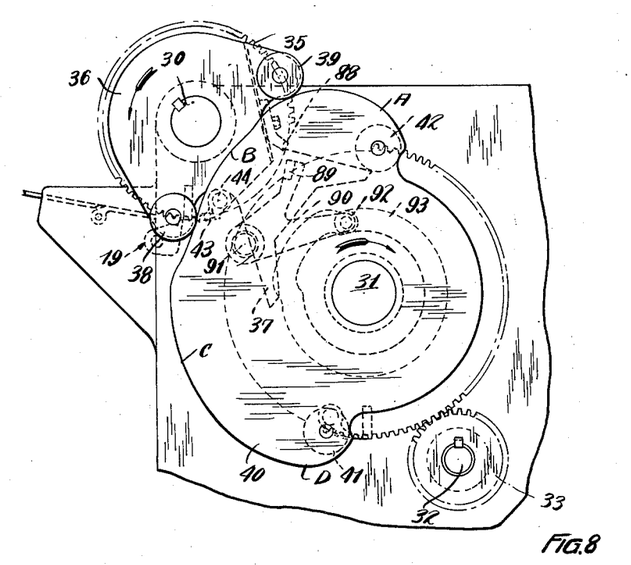
Fig. 8 is a similar view showing the grippers in a position forward of the stops. The deceleration of the feeding cylinder is just being completed.
Figure 9:
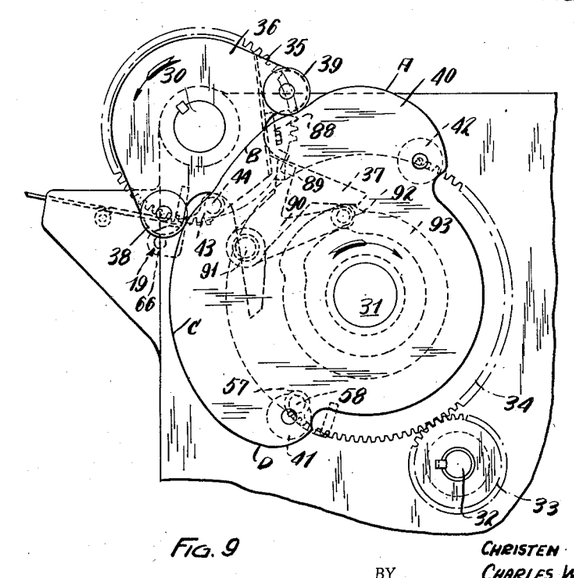
Fig. 9 is a similar view where the feeding cylinder has been rotated a short distance in a reverse direction to bring the sheet grippers into position to take the sheet. The feeding cylinder will now remain at rest for a period until the parts again reach the position illustrated in Fig. 4.

At this point the extension 37 and the roller 42 come into contact near the inner end of the extension. As the rotation continues the roller 42 rides outwardly on the extension 37, thereby decelerating the extension together with the cylinder 20 to which it is attached with a smooth and gradual decrease in speed. At the same time the roller 39 on cylinder 20 begins to ride up the sector A of came 40, which is so shaped as to permit this deceleration while at the same time holding the extension 37 against the roller 42 to insure positive connection between the parts during deceleration. The sector A of the came rises to a height somewhat above the concentric part C of the cam, and the sector B of the cam has a descending surface so that the roller 38 may run down beneath the concentric portion C of the cam. By this means a movement of the cylinder 20 somewhat beyond the initial position, shown in Fig. 4, is effected. This stage in the cycle is illustrated in Fig. 8. Here the sheet grippers 43 are carried beyond the front stop fingers 68, as indicated by dotted lines in Figs. 10 and 11. Up to this time the wear plate 89 has remained out of the path of stop 88, but as will be apparent from Fig. 9, the cam 93 then acts to swing the wear plate into the path of that stop.

Figures 5, 11, 12:
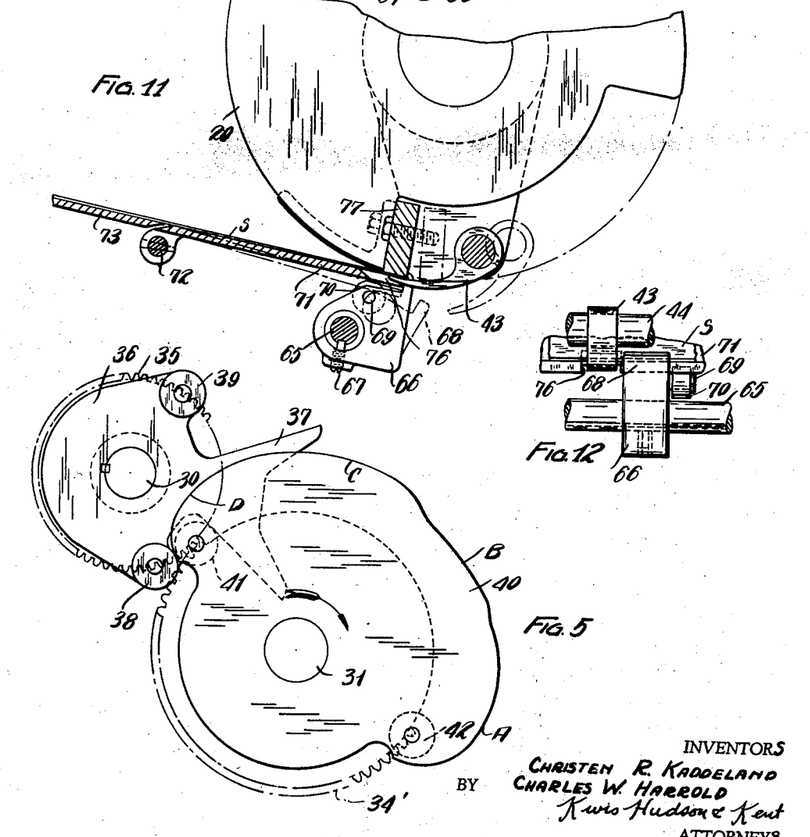
Fig. 5 is a view similar to Fig. 4 showing the parts in the position which they occupy at the point where the acceleration of the feeding cylinder to the speed of the impression cylinder is completed.
Fig. 11 is a view similar to Fig. 10, showing the front section of the feed board and the front register stops in raised or operative position, the feed cylinder having come to a stop and having undergone a short reverse movement to sheet gripping position and its sheet grippers having opened and closed upon a sheet then registered against the front stops.
Fig. 12 is a fragmental front view of the mechanism shown in Fig. 11.
Figure 6:
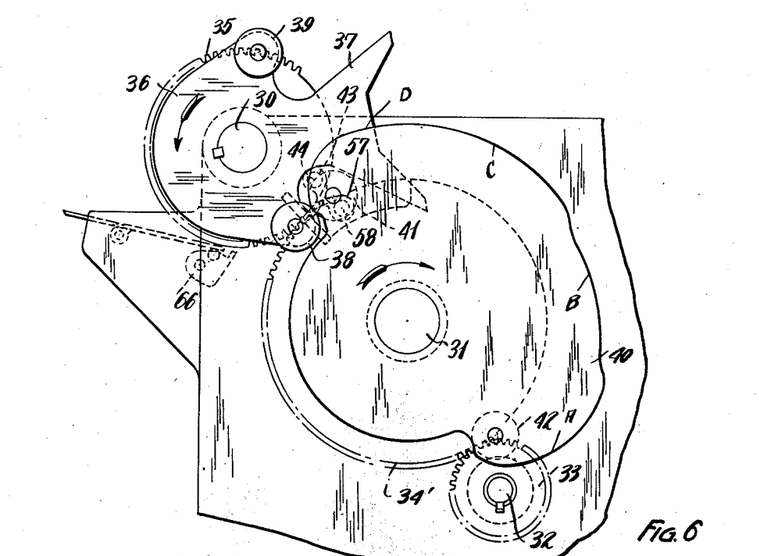
Fig. 6 is a view similar to Fig. 4 showing the parts in the position where the motion of acceleration has been concluded, the uniform motion of the feeding cylinder has been under way for a short period and the transfer of a sheet to the impression cylinder is being made.

Now, at about this time, the high spot of cam 55 comes into engagement with roller 54 on lever 52, causing pad 51 on the opposite end of the lever to depress roller 46 and open the sheet grippers 43, as shown in dotted lines in Figs. 10 and 11. Then roller 39 on cylinder 20 begins to run down to the low sector B of cam 40, and roller 38 runs up the incline between the sector B and the concentric sector C. This travel of roller 38 up onto sector C produces a short reverse rotation of cylinder 20, causing the sheet grippers 43 to move backward underneath the forward edge of the sheet then on the feed board 18. The stop 88 prevents the reverse rotation from going beyond the desired point. Then, while the grippers are in this position, the high spot of cam 55 runs out from beneath roller 54, and the opposite end of lever 52 is raised by its spring 52', permitting the grippers to be closed by spring 49. Soon thereafter the cam 78 lowers roller 79 and permits spring 85 to swing the forward stops 68 out of the way and lower the feed board section 71, so that the sheet may be moved forward as soon as the accelerating movement begins. This brings the mechanism again to the position of Fig. 4, and to the beginning of a new cycle of operations.

It will be seen that the form of the invention above described permits transfer of a relatively long sheet for a given size of impression cylinder and feed cylinder since provision is made to avoid interference of the feed cylinder grippers with the tail portion of the sheet. Furthermore, the position of succeeding sheets is not necessarily determined by the position of the feed cylinder, and hence the arrival of the sheets at the front stops need not be delayed until the sheet grippers have opened and passed through the plane of the sheet in advance of its front edge as would be necessary if the lowering feed board and reversing feed cylinder were not provided. Thus the leading edge of one sheet may be made to arrive at the registering point closely after or even before the tail of the preceding sheet has passed that point, thereby reducing the portion of each cycle of the impression cylinder expended in registering and transferring each sheet.

Fig. 16 represents a form of the invention, wherein a cam plate 140 is used instead of the cam plate 40. This cam has a long concentric portion E, a short ascending portion F, and a short descending portion G. The operation of the mechanism is the same in general as that of the first described form, except that there is no reverse rotation of the cylinder 20. In this form of the invention it is necessary to bring the cylinder 20 to a stop at the point where the sheet grippers come into operative relation with the front guides 19. The grippers may then be opened, the sheet fed down against the stops and the grippers again closed, these operations occurring while the cylinder 20 remains motionless because of the engagement of the concentric cam surface E with the rollers 38 and 39. An alternative arrangement is to have the grippers of the feed cylinder recede inwardly until they pass the front stops and then swing outwardly and backwardly to grip the sheet in the manner described in the application of Harrold et al., Serial Number 98,900, filed September 1, 1936.

Both the form of the invention shown in Fig. 16 and that shown in Figs. 4 to 9 are characterized by simplicity of construction and smoothness of operation, the number of parts is small, their cooperation positive, and disadvantages accompanying the use of odd-shaped gears are avoided.

Variations from the described structure may be employed. Accordingly we desire it to be understood that the scope of the invention is to be regarded as defined exclusively by the appended claims rather than by the foregoing description or the accompanying illustration.

Having thus described our invention, we claim:

1. In apparatus of the class described, a feeding cylinder having a motion of acceleration from a given starting point through a portion of a revolution, a rapid motion of rotation through a second portion of the revolution, a motion of deceleration through a further portion of the revolution to a point beyond said starting point, and a short reverse motion, said cylinder having a period of rest between said reverse motion and the next succeeding cycle of operations.

2. In mechanism of the class described, a sheet handling cylinder, a sheet feeding cylinder cooperating therewith, means operatively connecting said cylinders for imparting movement to the feeding cylinder from the sheet handling cylinder, said interconnecting means being arranged to revolve said sheet feeding cylinder from a position of rest somewhat more than one complete revolution and to then reverse the movement to the original position of rest, whereby grippers on the feeding cylinder may be carried past the forward edge of a registered sheet and then returned to receive and grip the sheet.

3. In mechanism of the class described, a sheet handling cylinder revolving continuously, a sheet feeding cylinder cooperating therewith, and means for operatively connecting said cylinders to produce interrupted motion in said feeding cylinder, said means comprising segmental gears on the two cylinders, cam means adapted to accelerate motion of the feeding cylinder prior to the meshing of the gear segments, to decelerate motion of the feeding cylinder after the gear segments move out of mesh, and to hold the feeding cylinder motionless during a period between the decelerating motion and the next succeeding acceleration, said cam means also providing a short reverse motion of the feeding cylinder just prior to its period of rest.

4. In combination, an impression cylinder, a feed board, a feed cylinder with its axis above the feed board for transferring sheets from the feed board to the impression cylinder, sheet grippers on said feed cylinder, and means for increasing the distance between said feed cylinder and feed board after the forward edge of a sheet has been gripped by said sheet grippers and until the sheet grippers have again reached the forward edge of the feed board on the next revolution of the feed cylinder.

5. In combination, an impression cylinder, a feed board, front stops at the forward end of said feed board, a feed cylinder with its axis above the feed board for transferring sheets from the feed board to the impression cylinder, sheet grippers on said feed cylinder, and means for increasing the distance between said feed cylinder and feed board after the forward edge of a sheet has been registered against the front stops and gripped by said sheet grippers and for again decreasing the distance immediately after the rear edge of the sheet passes said feed board.

6. In combination, an impression cylinder, a feed board, a feed cylinder for transferring sheets from the feed board to the impression cylinder, sheet grippers on said feed cylinder, and means for dropping said feed board temporarily after the forward edge of a sheet has been gripped by said sheet grippers.

7. In combination, an impression cylinder, a feed board, front stops at the forward end of the said feed board, a feed cylinder for transferring sheets from the feed board to the impression cylinder, sheet grippers on said feed cylinder, and means for temporarily dropping the feed board and lowering said front stops after the forward edge of a sheet has been registered against the front stops and gripped by said sheet grippers.

8. In combination, an impression cylinder, a feed board having a hinged forward section, front stops mounted to swing down out of the path of the sheets, a feed cylinder for transferring sheets from the feed board to the impression cylinder, sheet grippers on said feed cylinder, and means operatively connected with said front stops for causing the forward section of the feed board to swing down on its hinge when the front stops swing down, and to rise when the front stops rise.

9. In combination, an impression cylinder, a feed board, a feed cylinder for transferring sheets from the feed board to the impression cylinder, sheet grippers on said feed cylinder adapted to grip a sheet at the forward end of the feed board, means for revolving the feed cylinder from the sheet gripping position through slightly more than one revolution and then reversing its motion and returning it to starting position, means for supporting the feed board in a lowered position while the grippers are moving in a forward direction past it and for raising the feed board to operative position thereafter, and means for closing the grippers after the feed board has been raised and the grippers returned to sheet gripping position.

10. In combination, an impression cylinder, a feed board having a front section movable up and down, a feed cylinder for transferring sheets from the feed board to the impression cylinder, sheet grippers on said feed cylinder adapted to grip a sheet on the feed board when the latter is in raised position, means for revolving the feed cylinder from that position for transferring a sheet to the impression cylinder, continuing the feed cylinder movement back to and slightly beyond the starting position and then returning it to starting position, means for lowering the front section of the feed board while the sheet grippers pass it during their forward movement and for returning it to raised position thereafter, and means for opening the grippers after they pass the feed board and closing them after the reverse movement of the cylinder is completed.

11. In combination, an impression cylinder, a feed board, a feed cylinder for transferring sheets from the feed board to the impression cylinder, sheet grippers on said feed cylinder, means for feeding sheets in lapped relation to a position of rest on said feed board and adjacent said feeding cylinder, and means for temporarily increasing the distance between said feed cylinder and feed board once for each sheet transferred whereby the grippers on the feed cylinder may be made to clear a sheet on the feed board.

12. In a printing press, a constant speed sheet handling member, a rotary sheet transfer member adapted to remain stationary for a portion of its cycle of operation, and connections between said members comprising cam surfaces on each of said members and a pair of rollers on each member cooperating with the cam surfaces on the other member, said connections being operative to accelerate said transfer member from its stationary condition to the speed of the sheet handling member and to decelerate said transfer member back to a stationary condition.

13. In a printing press, a constant speed sheet handling member, a rotary sheet transfer member adapted to remain stationary for a portion of its cycle of operation, and connections between said members comprising a cam surface on the transfer member and a roller on the sheet handling member adapted to accelerate said transfer member from its stationary condition to the speed of the sheet handling member, and a cam surface on the sheet handling member and a roller on the transfer member adapted to prevent overrunning of the transfer member.

14. In a printing press, a constant speed sheet handling member, a rotary sheet transfer member adapted to remain stationary for a portion of its cycle of operation, and connections between said members comprising a cam surface on the transfer member and a roller on the sheet handling member adapted to accelerate said transfer member from its stationary condition to the speed of the sheet handling member, and a cam surface on the sheet handling member and a roller on the transfer member adapted to prevent overrunning of the transfer member, means for decelerating said transfer member to a stationary condition and intermeshing circular gear sectors on the two members for driving the transfer member between the periods of acceleration and deceleration.

15. In a printing press, a constant speed sheet handling member, a rotary sheet transfer member adapted to remain stationary for a portion of its cycle of operation, and connections between said members comprising a cam surface on the transfer member and a roller on the sheet handling member adapted to accelerate said transfer member from its stationary condition to the speed of the sheet handling member, and a cam surface on the sheet handling member and a roller on the transfer member adapted to prevent overrunning of the transfer member, means for decelerating said transfer member to a stationary condition and intermeshing circular gear sectors on the two members for driving the transfer member between the periods of acceleration and deceleration, the roller on each of said members being mounted with its axis on the pitch circle of the gear sector of that member.

16. In a printing press, a constant speed sheet handling member, a rotary sheet transfer member adapted to remain stationary for a portion of its cycle of operation, and connections between said members comprising cam surfaces on each of said members and a pair of rollers on each member cooperating with the cam surfaces on the other member, said connections being operative to accelerate said transfer member from its stationary condition to the speed of the sheet handling member and to decelerate said transfer member back to a stationary condition, and intermeshing circular gear sectors on the two members for driving the transfer member between the periods of acceleration and deceleration.

17. In a printing press, a constant speed sheet handling member, a rotary sheet transfer member adapted to remain stationary for a portion of its cycle of operation, and connections between said members comprising cam surfaces on each of said members and a pair of rollers on each member cooperating with the cam surfaces on the other member, said connections being operative to accelerate said transfer member from its stationary condition to the speed of the sheet handling member and to decelerate said transfer member back to a stationary condition, and intermeshing circular gear sectors on the two members for driving the transfer member between the periods of acceleration and deceleration, the rollers of each member being mounted with their axes on the pitch circle of the gear sector of that member.

18. In mechanism of the class described, a continuously rotating driving member, an intermittently rotating driven member, and connections between said members comprising cam means on each of said members, and means on each of said members coacting simultaneously with the cam means on the other member for imparting controlled variable movement to the driven member.

19. In mechanism of the class described, a continuously rotating driving member, an intermittently rotating driven member, and connections between said members comprising cams on each of said members, intermeshing gear sectors on said members, and rollers carried by each of said members at its gear pitch circle coacting with the cams on the opposite member for imparting variable movement to the driven member.

20. In combination, a continuously rotating sheet handling cylinder, a feed board, means for feeding sheets one after another in lapped relation onto the feed board, a feed cylinder adjacent the forward end of the feed board for transferring sheets from the feed board to the sheet handling cylinder, mechanism for driving the feed cylinder through a complete revolution with variable speed including a period of acceleration and a period of deceleration, sheet grippers on the feed cylinder, and means for altering the distance between the feed cylinder and said forward end of the feed board for causing said grippers to clear the plane of the sheet-supporting surface of the feed board.

21. Mechanism as claimed in claim 20 in which the means for altering the distance between the feed cylinder and the forward end of the feed board comprises means for moving the latter.

22. Mechanism as claimed in claim 20 in which the feed cylinder is positioned above the feed board and the means for altering the distance between the feed cylinder and the forward end of the feed board comprises means for lowering the latter for the purpose specified.

23. In combination, a continuously rotating sheet handling cylinder, a feed board, means for feeding sheets one after another in lapped relation onto the feed board, a feed cylinder adapted to transfer a sheet from the feed board to the sheet handling cylinder for each revolution of the latter, mechanism for driving the feed cylinder through a complete revolution for each revolution of the sheet handling cylinder with variable speed including a period of acceleration and a period of deceleration, sheet grippers on the feed cylinder, and means for altering the distance between the feed cylinder and the forward end of the feed board in synchronism with the rotary movements of the feed cylinder for causing said grippers to clear the plane of the sheet-supporting surface of the feed board.

24. Mechanism as claimed in claim 23 in which the means for altering the distance between the feed cylinder and the forward end of the feed board comprises means for moving the latter.

25. Mechanism as claimed in claim 23 in which th feed cylinder is positioned above the feed board and the means for altering the distance between the feed cylinder and the forward end of the feed board comprises means for lowering the latter for the purpose specified.

26. In combination, a continuously rotating sheet handling cylinder, a feed board, means for feeding sheets successively to a position of rest on the feed board, a feed cylinder for transferring sheets from the feed board to the sheet handling cylinder, mechanism for driving the feed cylinder through a complete revolution with variable speed including a period of acceleration, a period of deceleration and a period of rest, sheet grippers on the feed cylinder, and means for periodically altering the distance between the feed cylinder and the forward end of the feed board to cause said distance to be greater during said decelerating period than at certain other times for causing said grippers to clear the plane of the sheet-supporting surface of the feed board as the feed cylinder decelerates to its position of rest.

27. Mechanism as claimed in claim 26 in which the means for periodically altering the distance between the feed cylinder and the forward end of the feed board comprises means for moving the latter.

28. Mechanism as claimed in claim 26 in which the feed cylinder is positioned above the feed board and the means for altering the distance between the feed cylinder and the forward end of the feed board comprises means for lowering the latter for the purpose specified.

29. In combination, a continuously rotating sheet handling cylinder, a feed board, means for feeding sheets one after another in lapped relation to a position of rest on the feed board, a feed cylinder adapted to transfer a sheet from the feed board to the sheet handling cylinder for each revolution of the latter, mechanism for driving the feed cylinder through one complete revolution for each revolution of the sheet handling cylinder with variable speed including a period of acceleration, a period of deceleration and a period of rest, sheet grippers on the feed cylinder arranged and operated to grip a sheet on the feed board while the feed cylinder is at rest and to release the sheet to the sheet handling cylinder as the feed cylinder rotates, and means for increasing and decreasing the distance between the feed cylinder and the forward end of the feed board once for each sheet transferred to cause said distance to be greater as the grippers approach sheet gripping position during said decelerating period than when the grippers close on a sheet during said stationary period.

30. Mechanism as claimed in claim 29 in which the means for periodically altering the distance between the feed cylinder and the forward end of the feed board comprises means for moving the latter.

31. Mechanism as claimed in claim 29 in which the feed cylinder is positioned above the feed board and the means for altering the distance between the feed cylinder and the forward end of the feed board comprises means for lowering the latter for the purpose specified.

32. In combination, a continuously rotating sheet handling cylinder, a non-uniformly rotating feed cylinder cooperating therewith to receive sheets presented to the feed cylinder and transfer the same to the sheet handling cylinder, means for presenting sheets one after another to said feed cylinder with each sheet partially lapping the next succeeding sheet, said feed cylinder having grippers arranged to grip the front end of a presented sheet and release the same to the sheet handling cylinder, and means for driving the feed cylinder through a complete revolution after a given sheet has been gripped by said grippers and before the rear end of said given sheet has passed the position where the front end thereof was gripped.

33. In combination, a continuously rotating sheet handling cylinder, a non-uniformly rotating feed cylinder cooperating therewith to receive sheets presented to the feed cylinder and transfer the same to the sheet handling cylinder, means for presenting a stream of lapped sheets to said feed cylinder, said feed cylinder having grippers arranged to grip the foremost sheet of the stream, partially withdraw the same from the stream, and release the same to the continuously rotating sheet handling cylinder, said sheet handling cylinder continuing the withdrawal of the sheet, and means for driving the feed cylinder through 360° after a given sheet has been gripped by said grippers and before said sheet has been completely withdrawn from said stream.

34. In combination, a continuously rotating sheet handling cylinder, a non-uniformly rotating feed cylinder cooperating therewith to receive sheets presented to the feed cylinder and transfer the same to the sheet handling cylinder, means for presenting a stream of lapped sheets to said feed cylinder, said feed cylinder having grippers arranged to grip the foremost sheet of the stream, partially withdraw the same from the stream, and release the same to the continuously rotating sheet handling cylinder, said sheet handling cylinder continuing the withdrawal of the sheet, said presenting means operating to advance the next sheet toward presenting position while the foremost sheet is being withdrawn by the sheet handling cylinder, and means for driving the feed cylinder through 360° after a given sheet has been gripped by said grippers and before said sheet has been completely withdrawn from said stream.

35. In combination, means for feeding sheets one after another in lapped relation to a position of rest, stops for the front edge of a sheet in said position of rest, a continuously rotating sheet handling cylinder, an intermittently rotating feed cylinder cooperating therewith having sheet grippers arranged to grip the front edge of a sheet in said position of rest, accelerate the sheet and transfer it to the sheet handling cylinder, and means for imparting intermittent rotation to the feed cylinder, said means being arranged to impart a complete revolution thereto after a given sheet has been gripped thereby and before the rear end of said sheet has passed said stops.

36. In combination, means for feeding sheets one after another in lapped relation to a position of rest, a support for a sheet in said position of rest, a continuously rotating sheet handling cylinder, an intermittently rotating feed cylinder cooperating therewith having sheet grippers arranged to grip the front edge of a sheet in said position of rest, initiate withdrawal of the sheet from the support and release it to the sheet handling cylinder, and means for imparting intermittent rotation to the feed cylinder, said means being arranged to initiate rotation thereof after a given sheet has been gripped and to continue rotation thereof through 360° before the rear end of said given sheet has passed entirely off of said support.

37. In combination, means for feeding sheets one after another in lapped relation to a position of rest, a support for a sheet in said position of rest, a continuously rotating sheet handling cylinder, an intermittently rotating feed cylinder cooperating therewith having sheet grippers arranged to grip the front edge of a sheet, initiate withdrawal of the sheet from the support and release it to the sheet handling cylinder, and means for imparting intermittent rotation to the feed cylinder, said last mentioned means being arranged to initiate rotation thereof after a given sheet has been gripped and to continue rotation thereof through 360° while the portion of said support occupied by a sheet in said position of rest is covered by at least one sheet thickness.

38. In combination, means for feeding sheets one after another in lapped relation to a position of rest, a continuously rotating sheet handling cylinder, an intermittently rotating feed cylinder cooperating therewith having sheet grippers arranged to grip a sheet in said position of rest while the feed cylinder is stationary, accelerate the sheet and transfer the same to the sheet handling cylinder, means for driving the feed cylinder through a complete revolution with variable speed after a given sheet has been gripped by said grippers, and means for opening and closing said grippers functioning to maintain the grippers closed as they approach the completion of a full revolution following the gripping of a given sheet, to open the grippers after said revolution is completed and to subsequently close the grippers on the next following sheet.

39. In combination, means for feeding sheets one after another in lapped relation to a position of rest, a continuously rotating sheet handling cylinder, an intermittently rotating feed cylinder cooperating therewith having sheet grippers arranged to grip a sheet in said position of rest while the feed cylinder is stationary, accelerate the sheet and transfer the same to the sheet handling cylinder, means for driving the feed cylinder through slightly more than a complete revolution with variable speed after a given sheet has been gripped by said grippers and thereafter through a short reverse movement to sheet gripping position, and means for opening and closing said grippers functioning to maintain the grippers closed as the feed cylinder passes through sheet gripping position following the transfer of a given sheet, to open the grippers thereafter and to subsequently close the grippers on the next following sheet.

40. A combination as claimed in claim 37, wherein the forward end portion of said sheet support lies adjacent said feed cylinder, and including means for causing clearance between the plane of the sheet supporting surface of said forward end portion of said support and said grippers as said feed cylinder approaches completion of said 360° rotation.

CHRISTEN R. KADDELAND.
CHARLES W. HARROLD.